United States Patent [19]
Stanton et al.

[11] 3,907,388
[45] Sept. 23, 1975

[54] METHOD FOR BLENDING MULTIPLE COMPONENT STREAMS USING LOSS-IN-WEIGHT BOILING POINT ANALYSIS

[75] Inventors: Benjiman D. Stanton; Alvin D. Goolsby, both of Houston, Tex.

[73] Assignee: Shell Oil Company, Houston, Tex.

[22] Filed: Oct. 30, 1974

[21] Appl. No.: 519,373

Related U.S. Application Data

[60] Continuation-in-part of Ser. No. 293,627, Sept. 29, 1972, abandoned, which is a division of Ser. No. 63,534, Aug. 13, 1970.

[52] U.S. Cl. .................. 208/354; 137/3; 137/90; 196/32; 208/15; 208/DIG. 1
[51] Int. Cl.² ........................................... B01D 3/42
[58] Field of Search .......... 73/17 A, 61.3; 137/3, 4, 137/88, 90; 196/32; 201/1; 203/2; 208/DIG. 1, 15, 354, 355, 380

[56] References Cited
UNITED STATES PATENTS

| | | | |
|---|---|---|---|
| 2,350,006 | 5/1944 | Wolfner | 73/61.3 |
| 2,594,683 | 4/1952 | Rolfson | 73/17 |
| 3,364,731 | 1/1968 | Hook | 203/2 X |
| 3,451,402 | 6/1969 | Howard | 137/3 |

*Primary Examiner*—Herbert Goldstein

[57] ABSTRACT

A method for automatically performing distillation analysis of liquids wherein a sample of the liquid is vaporized while the temperature of the vapor and the weight of the sample are continuously measured and recorded. The method also provides for supplying the data to a computer programmed to provide preset percent distillation points for the sample and hold circuits that can be set to trigger at any preselected boiling point or cut point.

4 Claims, 9 Drawing Figures

METHOD FOR BLENDING MULTIPLE COMPONENT STREAMS USING LOSS-IN-WEIGHT BOILING POINT ANALYSIS

The present application is a continuation-in-part of application Ser. No. 293,627 filed Sept. 29, 1972, now abandoned which is a division of application Ser. No. 63,534 filed Aug. 13, 1970.

BACKGROUND OF THE INVENTION

The present invention relates to a method and apparatus for determining the distillation cut and boiling points of materials and particularly liquids. The problem arises in all process industries, particularly chemical and petroleum industries, of determining the distillation cut and boiling points of liquid samples. In the past a recognized method known as an ASTM method (D86) has been developed for determining distillation cut points. This method comprises placing a measured amount of the liquid in a container and heating the liquid to vaporize it with the vapor being collected and condensed. The various cut points are determined by measuring the amount of liquid as it is condensed and recording the temperature. It requires a skilled operator and 45 minutes to perform a complete distillation anaylsis of a liquid by this method.

The results obtained with the ASTM method depend to a large extent on the skill of the operator and his attention to the process. Even when the operator is skilled and attentive the method still suffers from incomplete condensation of the sample. When unskilled operators are used the sample size, initial sample temperature and sample recovery may all vary to produce inaccuracies and variations in the results.

Various apparatus have been developed to automate or at least partially automate the above method to eliminate the dependence on the operator. These apparatus have comprised the boiling of a known amount of liquid and collecting the vapor to determine the various distillation cut point of the liquid. These methods while eliminating the need for a skilled operator are time consuming since they substantially duplicate the steps of the ASTM method. Also, the automated method require equipment to condense and measure the quantity of condensed liquid to determine the various distillation cut-points.

In addition to the above problems with available apparatus they are substantially batched-type apparatus and relatively slow. The slow operation produces a time lag between taking of a sample and the obtaining of the distillation points. The time lag prevents the use of present systems with process controls since the information they supply is out-of-date and not related to the present state or operating levels of the process.

BRIEF DESCRIPTION OF THE INVENTION

The present invention solves the above problems by providing a method and apparatus which is completely automatic and provides a complete distillation analysis of the sample in a short time. The method measures the loss-in-weight of a sample of material as it is heated to determine the various percentage cut-points of the material. As the various percentage cut-points of the material are determined the temperature of the vapor which is being continuously measured, is recorded. The cut-points and temperature can be made to correspond closely to the cut-points obtained by the ASTM method. The analyzer can be adjusted to operate either as a cut-point analyzer or a boiling point analyzer.

The apparatus comprises a sample holder for holding a sample of material with the sample holder being attached to one end of a beam balance. A weight detector is positioned at the opposite end of the beam balance to meaure the loss-in-weight of the material as it is heated. The apparatus includes controls for supplying a preset amount of sample to the sample holder and controlling the heating of the sample to obtain the desired rate of evaporation of the sample. After the sample is evaporated the sample holder is purged to both cool it and remove the remaining traces of the sample. The system is automatically zeroed before each new sample is placed in the sample holder. This is done to compensate for build-up of residue in various portions of the sample holder and low frequency drift of the electronic circuits.

The weighing means may be either a device which actually weighs the sample and sample holder or a device which determines the displacement of the end of the beam. The signals representing the temperature and the loss-in-weight of the sample can be recorded in correlation so that the various percentage cut-points and corresponding temperatures may be determined. These variables can be sampled at preset positions to give output data on specific cut-points and/or temperatures. The signals from the temperature and weighing means may also be supplied to an analog-to-digital converter for conversion to digital numbers. The digital numbers can then be supplied to a computer which will compute the various percentage cut-points and print out the corresponding temperatures. Of course, the computer can also be used to control the process utilizing the information from the apparatus.

The system requires a relatively short time to perform a complete distillation anaylsis, for example, a 10cc sample can be evaporated in approximately five minutes to obtain the same degree of accuracy that is obtained using a skilled operator and following the ASTM method. This time can be further reduced to a minimum of approximately three minutes if a smaller sample is used. When a small sample is used the accuracy is not as good as the ASTM method but is normally satisifactory for most purposes.

The system can also be used directly to control a process. For example, when two streams of product from distillation columns are blended to form a finish product having a specified boiling or cut-point the system can monitor the column streams and control the columns. This is accomplished by supplying the sample holder with a ratio of the two column streams, the ratio being determined by the finished product. If the analyzer determines the ratio it does not supply a finished product having the desired characteristics, then its signal can be used to vary the column streams to obtain a more accurate ratio.

BRIEF DESCRIPTION OF THE DRAWINGS

The present invention will be more easily understood from the following detailed description of a preferred embodiment when taken in conjunction with the attached drawings in which.

DESCRIPTION OF THE PREFERRED EMBODIMENT

Figure 1:
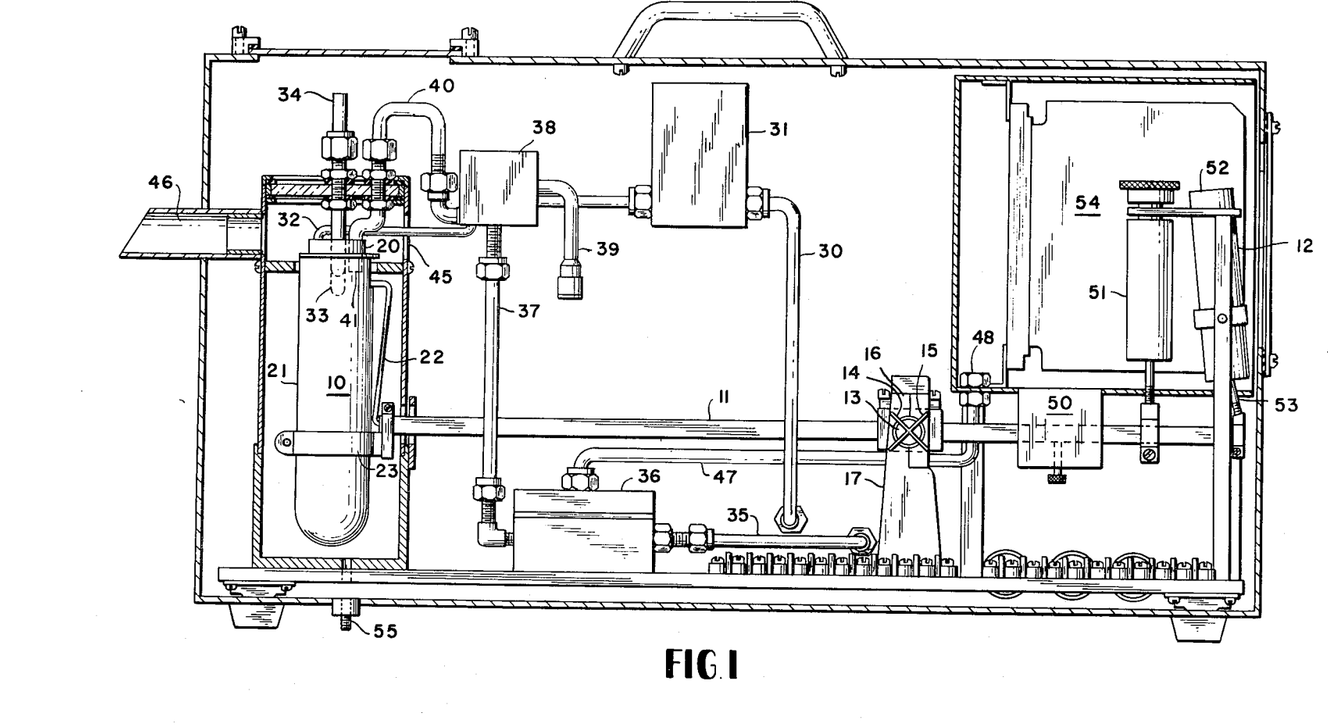
FIG. 1 is an elevation view of an instrument constructed according to this invention.

Referring to FIG. 1 there is shown an elevation view of a complete instrument constructed according to this invention. The instrument utilizes loss-in-weight to determine the percentage distillation cut-points of a liquid sample. A preset quantity of sample is placed in a sample holder 10 which is attached to one end of the beam 11. The beam is flexurally pivoted at its center 13, for example Bendix and Rex pivots, and the movement of the opposite end of the beam is measured by means of a linear displacement device 12 (LVDT).

The sample holder comprises a sample tube 20 which holds the liquid sample and a heating section or outer housing 21. The heating section contains a suitable heating means, for example a resistance heater which is coupled by means of a lead 22 to a source of power. The leads 22 pass through the center of the beam and are taken out near the flexure pivot to eliminate the possiblity of the leads creating a load on the beam and destroying the accuracy of the measurement.

The liquid sample is supplied through a line 30 to a solenoid valve 31 that controls the flow of the sample to the sample tube 20. The outlet of the solenoid valve is coupled by means of a line 32 to the top of the sample tube. Also disposed in the top of the sample tube are thermocouple 33 and an outlet 41 for the purge line. All of the elements 32, 33 and 41 should be positioned so that they do not contact the sides of the sample tube or interfere with the free movement of the beam and the sample holder.

Purging air is supplied by means of a line 35 to a solenoid valve 36 that controls the flow of the purging air to the sample tube in response to signals received from the control system described below. The discharge from the purge control solenoid is coupled by means of a line 37 to a vortex tube 38 with the hot end 39 of the vortex tube discharging to the atmosphere while the cold dishcarge from the vortex tube is connected by a lead 40 to the purge inlet 41 in the top of the sample tube. The use of the vortex tube provides cold air for both purging and rapidly cooling the sample holder so that all samples may be run under the same conditions.

The vapors which are evolved from the sample as it is heated are swept from the top of the sample tube by means of a flow of air through the inlet opening 45 and the exhaust opening 46. This flow of air may be supplied from the same external source as the purge air. The inlet 35 can be coupled directly to a line 47 that discharges from its open end 48 into the housing 54 containing the electronic circuits. The air escapes from the housing 54 at the right hand end and flows out the opening 45–46 to sweep the vapors from the housing. This air flow insures that vapors do not flow into the electronic circuits and at the same time cools the circuits.

A counter-weight 50 is provided on beam 11 to counter-balance the weight of the sample holder. The placement of the counter-balance is not critical since the actual displacement of the beam is measured by means of the device 12. An adjustable dashpot member 51 is coupled to the beam to limit or control sudden movements of the beam and for stabilizing the beam. The linear measuring device may be a linear displacement device that supplies an electrical signal proportional to the displacement of its core member 53 that is coupled to the end of the beam by a suitable clamp. A Schaevitz motion transmitter manufactured by Schaevitz Engineering of Pennsauken, N.J., may be used for the linear displacement measuring device. A drain 55 provides for disposal of sample resulting from overflow or leakage.

Figure 2:
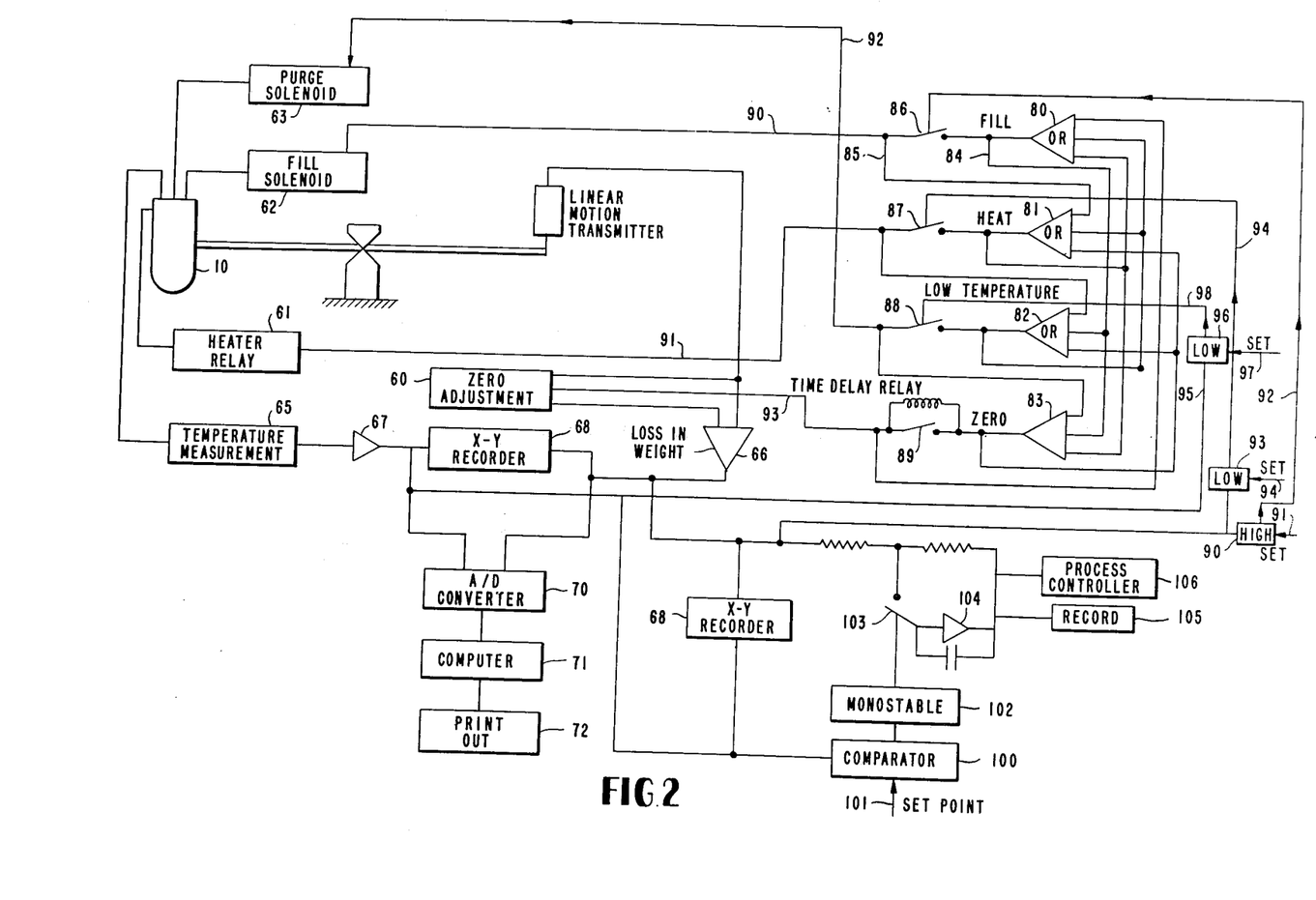
FIG. 2 is a schematic diagram in block form of the control circuits of this invention.

The control circuit for the apparatus is shown in FIG. 2 in a block diagram form. The control system utilizes a series of solenoid valves and relays 61–63 to control the flow of the sample to the sample tube, the flow of purging air for purging the sample tube and the flow of electrical current supplied to the heater element of the sample container. The position of the solenoid valves is controlled by a controller in response to various conditions existing in the device as explained below. The control system also utilizes a zero adjustment circuit 60 which adjusts the signal from the position-measuring device to a zero level after the sample holder has been purged. This compensates for residues remaining in the system, the build-up of foreign matter and low frequency drift of the circuits.

The linear motion transmitter is coupled to a loss-in-weight measuring circuit comprising an amplifier 66. The zero adjustment circuit is also connected to the amplifier 66 to adjust the amplifier to a zero output after the sample tube has been purged. The thermocouple is coupled to a temperature measuring circuit also consisting of an amplifier 67. The signals from amplifiers 66 and 67 representing the loss-in-weight of the sample and the temperature of the vapor are supplied to an X–Y recorder 68 that records the loss-in-weight of the sample in correlation with the temperature of the vapor. The two signals are also supplied to an analog-to-digital converter 70 whose output is supplied to a computer 71 programmed as set forth below so that it will supply a print-out indicating the percentage distillation cut-points and the corresponding temperatures as selected.

The controller for automatically controlling the operation cycle of the instrument is shown on the right of FIG. 2 and utilizes a series of operational amplifiers 80–83 coupled as OR gates and disposed in closed loop so that when any one conducts the remainder are latched out. In this type of circuit the output signal of one OR gate is used to latch out the remaining gates with the coupling to the next succeeding gate having a switch disposed in its circuit. For example, the output of OR gate 80 is coupled by a lead 84 to OR gates 82 and 83 and by a lead 85 to OR gate 81 with a switch 86 disposed between the take-off points of the two leads 84 and 85. Thus, the OR gates 81–83 remained latched out as long as OR gate 80 is triggered or until relay switch 86 is opened. When relay switch 86 opens the OR gate 81 will be triggered since the output signal from OR gate 80 is no longer applied to the input of OR gate 81. The remaining OR gates will remain latched out and OR gate 80 will be latched out when OR gate 81 is triggered. This circle of operation will continue as the relay switches 86, 87, 88 and 89 are opened and closed. The opening relay switches are controlled by signals from various portions of the apparatus as explained below while the relay switches return to a normally closed position in the absence of a signal.

The relay switch 86 is controlled by output signal of the loss-in-weight circuit so that it opens whenever the weight of the sample reaches a preset high value. This is accomplished by a comparing circuit 90 that compares the weight signal with a present value 91 and supplies a signal on lead 92 to open relay switch 86 when the weight of sample equals the preset value. In a similar manner comparing circuit 93 compares the weight signal with a preset value and supplies a signal on lead 94 to open relay switch 87 when the weight of sample reaches a preset low value. The temperature signal is supplied over a lead 95 to a comparing circuit 96 where the temperature is compared with a preset value 97. The signal from the comparator 96 is supplied over lead 98 to open relay switch 88 when the temperature of the interior of the sample holder reaches a lower limit. The switch 89 is a time delay whose coil is coupled in the output lead of the OR gate 83. The time delay is set sufficiently long to permit the weighing circuit to adjust to zero, for example 10 seconds. The output signals of the OR gates 80–83 are supplied over leads 90–93 to the fill solenoid 62, heater relay 61, purge solenoid 63 and zero adjustment circuit 60, respectively. The sequence of operation of the circuit is described below under operation.

In addition to recording the temperature versus weight curve on the x–y recorder 68, the temperature and weight signals are also supplied to a sample and hold circuit that records any preset cut-point or boiling point. The sample and hold circuit uses a comparator 100 that compares either the temperature or weight, for example the temperature as shown in FIG. 2, with a preset value 101 to give the cut-point for the temperature. The output signal from the comparator is supplied to a monostable circuit 102 that closes the relay switch 103 to complete the input circuit to the amplifier 104. The signal from the amplifier 104 can be recorded on the recorder 105 to give the cut-point for the present temperature or supplied to a process controller 106. The process controller can position the controls of a distillation column to control the column reflux and reboiling to supply the proper top and bottom products.

Figure 3:
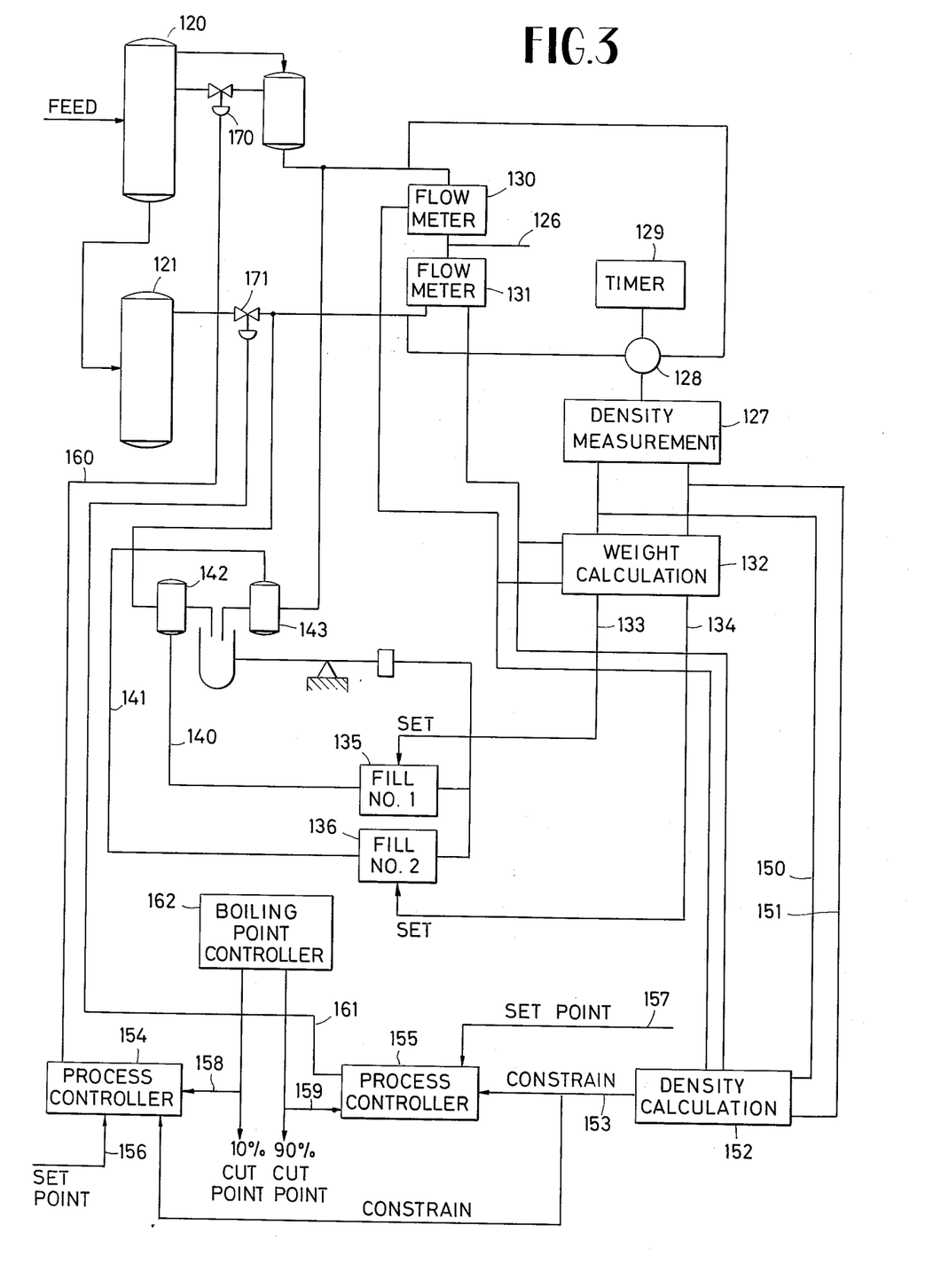
FIG. 3 is a block diagram of the system used to control the blending of two column streams.

FIG. 3 illustrates the use of the apparatus to control the blending of two streams to produce a final product whose density and cut-points meet present specifications. As an example, the product may be gas turbine fuel blended from the top product of a column 120 and the side stripper product from a second column 121. The bottom product from the column 120 is used as the feed for the second column 121. It may be desirable in some blending operations to provide small storage tanks instead of blending the products directly as they flow from the columns. Small storage tanks may be needed to provide for surges in the flow of product from the columns.

The density of the products is determined by density measuring apparatus 127 which may be a commercial density apparatus such as that offered by Automation Products, Inc. of Houston, Texas, under the trade name Dynatrol. While two separate density measuring instruments may be used only one is shown in the attached drawing and the product streams switched by a three-way valve 128 which is positioned by a timer 129. The cycle of the timer is chosen so that the two product streams are periodically switched, for example, at intervals of 5 minutes to 1 hour, since the density of the individual product streams changes very slowly. The product stream flowlines from the two columns also include flow meters 130–131 which measure the volume of flow of each of the product streams. The signals from the two flow meters, preferably electrical signals, are supplied to a weight calculating control 132. The weight calculating control 132 determines the actual weight of each of the products being blended as a percentage of the whole. This calculation is necessary since the boiling point analyzer described above is filled and measurements are made on the basis of weight and not volume. The calculation of the individual weights can be accomplished using analogue devices since the density and the volume of the individual products are measured. A calculated weight of each flow in the blend is supplied as a signal over leads 133–134 to two fill controls 135–136 of the analyzer. The fill controls can supply signals over the leads 140–141 to actuate the valves 142–143 to supply the required weight of each of the products. The boiling point analyzer will then determine the 10 and 90% cut points of the blended product.

The density measurements and the flows of the two products are also supplied to a density calculator 152. The density calculator can also be built from analogue devices, for example operational amplifiers, adjusted to multiply the flows times the densities and sum the two products, and then divide by the total flow volume to obtain the density of the blend. The density of the blend is compared with the specified density and a signal over lead 153 to provide a constraint for two process controllers 154–155 when measured density equals or exceeds the specified density. The process controllers are also supplied with set points 156–157, respectively, which are proportional to the 10 and 90% boiling points specified for the blended product. The process controllers, in addition, are supplied over the leads 158–159 with the actual 10 and 90% boiling points of the blended product as measured by the analyzer. Thus, the controllers will position the control valves 170–171 to adjust the measured boiling points to the specified boiling points until either the specified boiling point or a constraint level is reached. The signal from the controller 154 is supplied by lead 160 to control the recirculation of the reflux by positioning a valve 170 in the reflux line. The signal from the controller 155 is supplied by lead 161 to a valve 171 to control the flow from the side draw of the column 121. Normally, the product from the side draw of the column 121 will be a heavier product and, thus, tend to raise the 90% boiling point while the product from the top of the column 121 will be a lighter product and tend to lower both the 10% and the 90% boiling points. Normally, the side draw product, being a heavier product, will be a less valuable product and, thus, the greater amount of the side draw product that can be included in the blend without causing the blend to be off specification will increase the profit. This can be accomplished by setting the controller at 155 to increase the amount of side draw until either the 90% boiling point level or the density constraint is reached. By similar manner, the process controller 154 can be adjusted so that it does not change the reflux flow until the 10% boiling point of the blend rises above the set point. In this manner the above system utilizing the boiling point analyzer of this invention will automatically blend the two product streams to supply a product which is within specifications while maximizing profit.

The following is a specific example of a blending operation controlled by the above system: at the beginning of a test the production ratio by volume of the top product to the side product was 35 to 65%. Similarly, the specific gravities of the two materials were 0.791 for the top product and 0.828 for the side draw product. The specified 10% boiling point was 347°F to 400°F and the 90% boiling point maximum was 500°F, while the specific gravity was 0.775 to 0.830. Using the initial volume ratios and specific gravities, the weight settings for the boiling point analyzer were calculated 34 and 66% of total weight, respectively. The density and boiling points of the blend were well within specifications, thus, the amount of top product included in the blend was held constant while the side draw was increased until a volume ratio of 29.5% - 70.5% was reached with specific gravities of 0.794 and 0.834 for the two product streams, respectively. The small changes in the specific gravities was a result of the change in the quantity of each product removed from the columns 120 and 121. By increasing the side draw product the 90% boiling point was raised to 500°F while maintaining the 10% boiling point and density within specifications. While the change in actual volume ratios between the two products was small the larger volume of the side draw product produced an increase in volume of production in 18.7%.

The computer 71 may be programmed in any desired language, for example, a program language known as BASIC wherein the commands to the computer are supplied in a substantially conversational language. An example of this programming is set forth below:

```
List

91      FOR K=1 TO 4
92      CALL (4,K,0)
93      NEXT K
95      PRINT "STARTING"
100     LET C=0
101     LET D1=15
110     LET K=0
120     CALL (7,0,P)
121     IF P≠0 THEN 9999
122     GOSUB 2000
130     CALL (4,1,0)
131     IF K=2 THEN 150
132     IF K=4 THEN 150
140     WAIT (100)
150     GOTO 120
2000    LET C=C+1
2010    REM 2200=PURGE, 2300=WAIT, 2400=FILL, 2600=CHECK, 2800=HEAT
2020    IF K=0 THEN 2200
2030    IF K=1 THEN 2300
2040    IF K=2 THEN 2400
2050    IF K=3 THEN 2600
2060    IF K=4 THEN 2800
2100    CALL (1,5,T)
2101    LET T=100+600*T
2102    RETURN
2110    CALL (1,1,W)
2112    RETURN
2200    CALL (4,2,1)
2210    GOSUB 2100
2220    CALL (1,3,T1)
2221    LET T1=T1*100
2230    IF T<T1 THEN 2260
2240    RETURN
2260    CALL (4,2,0)
2270    LET K=1
2280    LET C1=C
2290    RETURN
2300    IF C>C1+D1 THEN 2350
2310    RETURN
2350    GOSUB 2110
2355    LET W1=W
2360    LET K=2
2365    IF W1>-.1 THEN 2375
2370    RETURN
2375    PRINT "CRUD BUILT UP"
```

```
2376  GOTO 9999
2380  RETURN
2400  CALL (4,3,1)
2420  GOSUB 2110
2340  IF W>W1+1 THEN 2450
2440  RETURN
2450  CALL (4,3,0)
2470  LET K=3
2480  LET C1=C
2490  RETURN
2600  CALL (4,3,0)
2615  GOSUB 2110
2618  IF C>C1+D1+1 THEN 2630
2620  IF C>C1+D1 THEN 2650
2630  RETURN
2650  LET W2=W
2670  RETURN
2680  IF (W-W2)/(W2-W1)>1.0000E-02 THEN 2790
2684  LET K=4
2690  FOR S=1 TO 9
2700  LET W[S]=W2-(2^2-W1)*S/10
2710  NEXT S
2720  LET S=1
2730  RETURN
2790  PRINT "FILL DIDN'T TURN OFF"
2792  PRINT W;W1;W2
2799  RETURN
2800  CALL (4,4,1)
2810  GOSUB 2110
2815  IF S=10 THEN 2960
2820  IF W<W[S] THEN 2900
2830  RETURN
2900  LET W[S]=W
2910  LET W[S]=W
2920  GOSUB .2100
2930  LET T[S]=T
2940  LET S=S+1
2950  RETURN
2960  CALL (1,4,E1)
2968  IF W<W2-(W2-W1)*E1 THEN 2975
2970  RETURN
2975  LET K=0
2977  CALL (4,4,0)
2978  GOSUB 3000
2980  RETURN
3000  PRINT "#    % BOILED    TEMP"
3002  FOR S=1 TO 9
3005  LET W[S]=(W2-W[S])*100/(W2-W1)
3010  PRINT S;W[S];T[S]
3020  NEXT S
3025  PRINT "WEIGHTS";
3026  PRINT W2,W1
3027  PRINT "---------"
3030  RETURN
9999  END
```

READY

From the above program it can be seen that the first steps are to command the computer to recall from memory preprogrammed data and set various constants equal to various values. The computer is then told to let various constants perform various functions if various temperature and weight conditions exist in the system. The system is then operated until the steps for commanding the computer to print-out the various percentage boiling points when $w$ equals a certain percentage of the initial weight. Thus, if all the steps up to 2800 have been satisfied the computer will commence to print-out the temperatures for the various percentage boiling points as they are reached. Also the signal from the computer indicating the temperature per percentage boiling point can be transmitted to a separate control system, not shown, in FIG. 1 to be used in a process control.

The following are four distillation cut-point analyses as measured by the instrument and computer by the computer following the above instructions.

| No. | % BOILED | TEMPERATURE | |
|---|---|---|---|
| 1 | 10.0321 | 381.845 | |
| 2 | 20.209 | 396.493 | |
| 3 | 30.2904 | 408.789 | |
| 4 | 40.1336 | 421.094 | |
| 5 | 50.0243 | 432.227 | No. 11 |
| 6 | 60.0104 | 442.773 | |
| 7 | 70.3781 | 453.32 | |
| 8 | 80.0291 | 463.574 | |
| 9 | 90.0142 | 477.344 | |
| WEIGHTS | .595215 | | −.426743 |

| No. | % BOILED | TEMPERATURE | |
|---|---|---|---|
| 1 | 10.1763 | 381.259 | |
| 2 | 20.018 | 396.786 | |
| 3 | 30.0038 | 408.496 | |
| 4 | 40.0383 | 421.094 | |
| 5 | 50.0244 | 432.812 | No. 12 |
| 6 | 60.1064 | 443.066 | |
| 7 | 70.0435 | 453.32 | |
| 8 | 80.0773 | 463.867 | |
| 9 | 90.0143 | 479.687 | |
| WEIGHTS | .585938 | | −.431137 |

| No. | % BOILED | TEMPERATURE | |
|---|---|---|---|
| 1 | 10.1277 | 380.38 | |
| 2 | 20.1135 | 395.322 | |
| 3 | 30.0515 | 407.324 | |
| 4 | 40.0859 | 419.922 | |
| 5 | 50.0243 | 432.227 | No. 13 |
| 6 | 60.2493 | 443.066 | |
| 7 | 70.2826 | 452.734 | |
| 8 | 80.0291 | 463.281 | |
| 9 | 90.1098 | 475.879 | |
| WEIGHTS | .59668 | | −.425278 |

| No. | % BOILED | TEMPERATURE | |
|---|---|---|---|
| 1 | 10.3733 | 381.259 | |
| 2 | 20.0757 | 395.029 | |
| 3 | 30.0662 | 407.91 | |
| 4 | 40.0575 | 419.629 | |
| 5 | 50.2886 | 432.52 | No. 14 |
| 6 | 60.0392 | 443.945 | |
| 7 | 70.3653 | 453.613 | |
| 8 | 80.1157 | 464.453 | |
| 9 | 90.0095 | 477.93 | |
| WEIGHTS | .585449 | | −.431137 |

OPERATION

As explained, the system operation is substantially automatic and once the quantity of sample to be used and the heating rate have been set no further adjustmens are required. Of course, a supply of sample under suitable pressure, 5–100 psig and a source of compressed air for purging the device and ventilating air for removing the vapors as they are evolved from the sample are all essential. With necessary services coupled the instrument can be started by the controller. The first step performed by the controller is the zeroing of the sample holder. This can be done by applying a temporary large voltage signal to the heating circuit which trigger the OR circuit 81. When the large voltage signal is removed the relay switch 87 will open since the sample holder is empty. The opening of the relay switch 87 will trigger purge OR gate 82 and the relay switch 88 will open when the purge air has cooled the sample holder. When the relay switch 88 opens the zero OR gate 83 will trigger and zero the loss in weight amplifier 66. When the time delay relay 80 times out the switch 89 will open and trigger the fill OR gate 80. The quantity of sample supplied depends on the level of the set point 91 that controls the time that OR gate 80 remains triggered. After the sample has been supplied the relay switch 86 will open and trigger the heating OR gate 81 to supply a predetermined voltage to the heating element. By selecting the voltage in relation to the quantity of sample supplied one can obtain the desired heating rate of the sample. The sample will then be evolved as the weight of the sample is continuously measured by the linear displacement device 12. In the sample system the weight of the sample will be recorded in relation to the temperature of the sample and various percentage cut-points can be determined by either inspecting the record or the sample and hold circuit. After the sample has been evaporated the relay switch 87 will open and trigger the purge OR gate 82 to open the purge solenoid and supply purge air to the system. When the temperature of the sample holder (as measured by the thermocouple) reaches a preset level the relay switch 88 opens closing the purge solenoid and triggering the zero OR gate 83. The system will repeat the above sequence of operation and supply distillation analysis of the sample stream connected to the system.

The sample stream connected to the system may be a stream from a process or may consist of previously collected samples which are supplied individually to the system. In the case of a process suitable timing devices can be coupled to the instrument so that it only analyzes the sample at set time intervals or the instrument can be set to continuously analyze the process to provide data for controlling the process.

Figure 4:
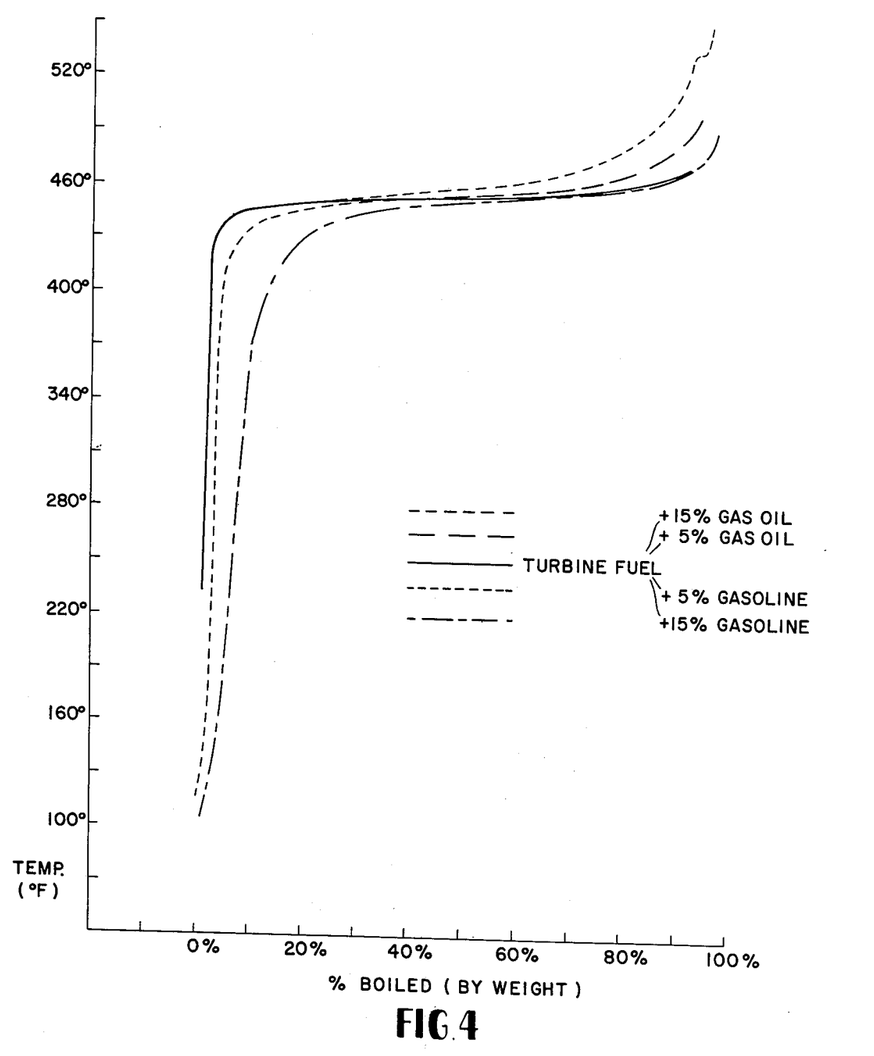
FIG. 4 is a curve of the distillation cut-points of a turbine fuel containing various additives.

FIG. 4 shows the distillation cut-points for a turbine fuel that is diluted with various percentages of impurities. From FIG. 3 it is seen that if the turbine fuel is blended with a heavy gas oil the temperature of the higher cut-points is raised while if the turbine fuel is diluted with a lighter hydrocarbon as for example, gasoline, its initial cut-points are lower. Thus, the instrument responds to compositional changes in the same manner as the ASTM method.

Figure 5:
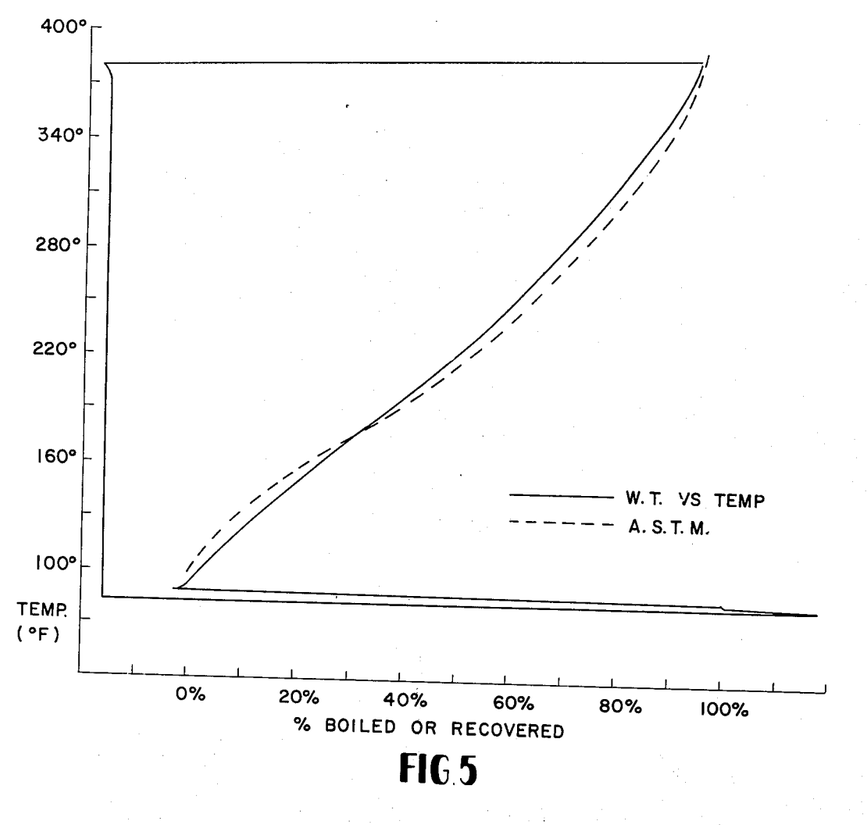
FIG. 5 is a comparison of the cut-points for gasoline obtained using the processes of the invention with those obtained with the ASTM method.
Figure 6:
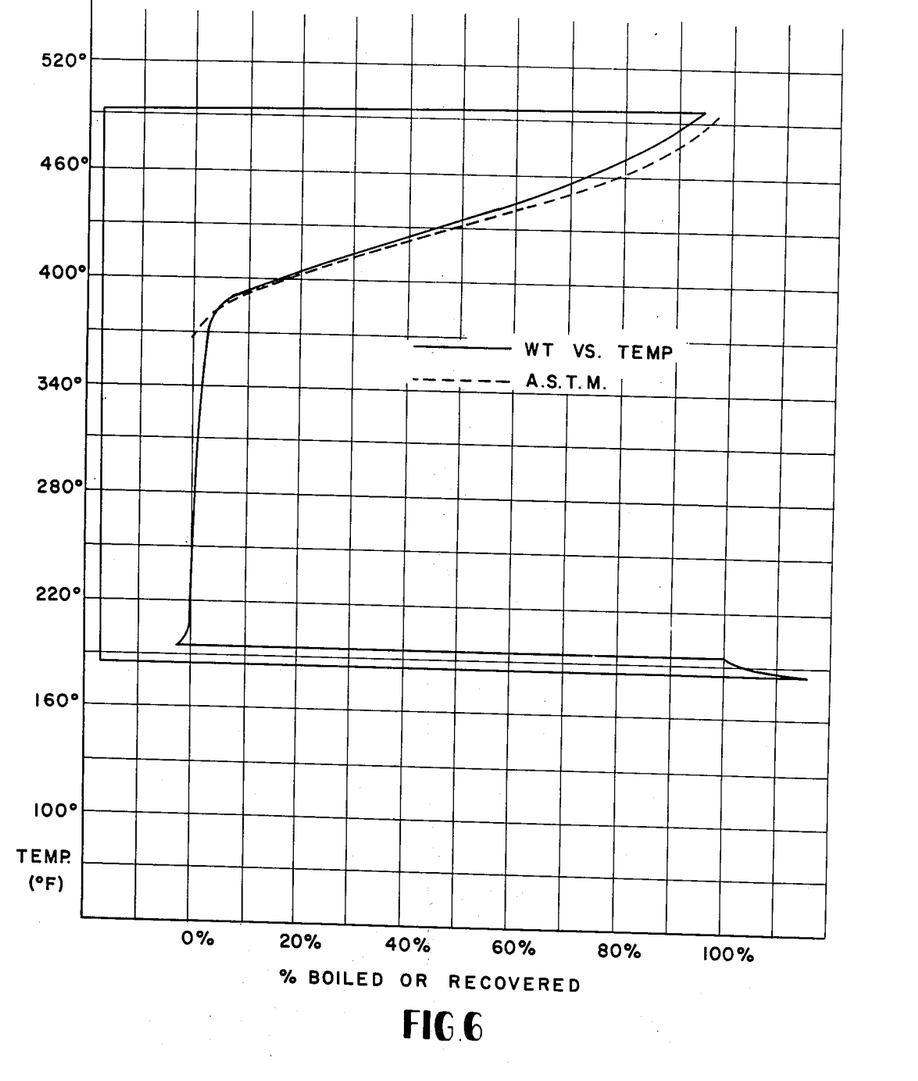
FIG. 6 is a similar comparison for kerosene.

FIGS. 5 and 6 show a comparison between the cut-points obtained using the present instrument and the ASTM method where the amount of liquid evaporated is measured and the temperatures at which it evaporated recorded. From a comparison of these two chart records it is seen that the present instrument provides results which are within approximately 5 percent of the ASTM recordings. This is sufficiently close for all practical purposes and can be used in control processes.

Figure 7:
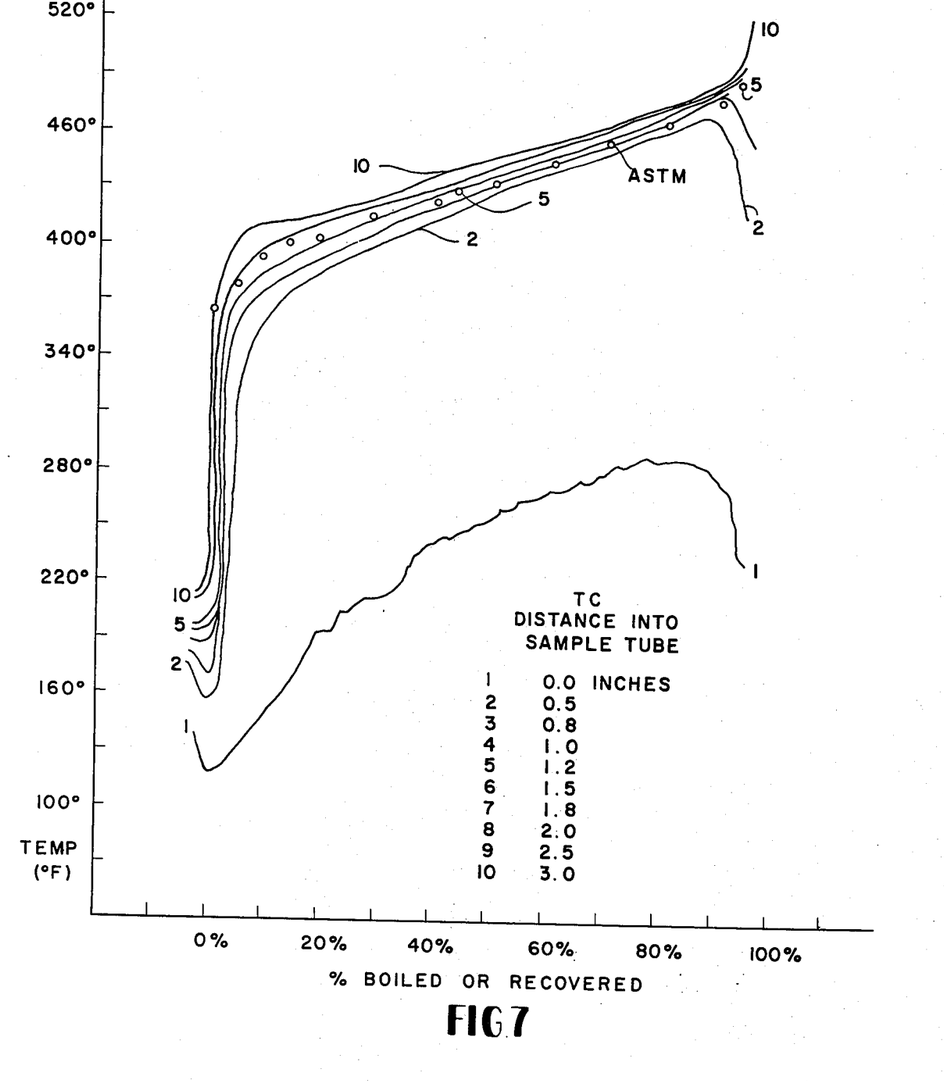
FIG. 7 illustrates the effect of thermocouple position on the cut-points for kerosene.

Referring to FIG. 7 there is shown a comparison of results obtained using various distances between the thermocouple and the top of the sample tube. Also shown is an ASTM distillation analysis for the same sample. From the information shown it can be seen that if the thermocouple projects approximately 1.2 inches into the same tube wherein the sample tube comprises a tube of 1.1 inches diameter and 4.5 inches length containing 10 cc. of sample; the results obtained will be substantially equal to the ASTM method. The same results would be obtained regardless of the size of the sample tube provided the thermocouple projects into the tube at least a distance equal to approximately 25% of the overall length of the tube. This insures that the temperature measured by the thermocouple is substantially the true temperature of the vapor evolved from the sample.

Figure 8:
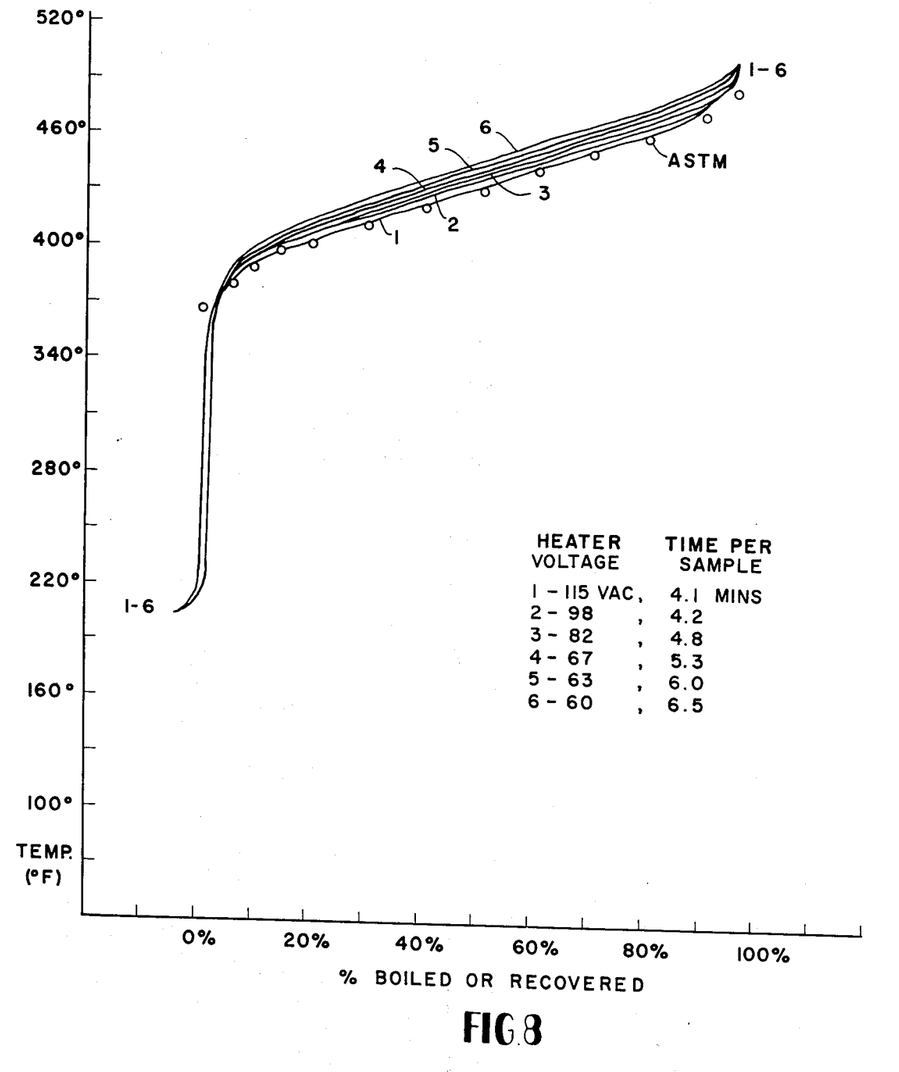
FIG. 8 illustrates the effect of heating rate on the cut-points for kerosene.

Referring to FIG. 8 there is shown a comparison between an ASTM distillation curve and the data obtained with the apparatus of this invention utilizing various heating rates. From the data it can be seen that if the heating rate is set to completely evaporate a 10 cc. of sample in approximately four minutes the results substantially equal the results obtained on the ASTM method.

Figure 9:
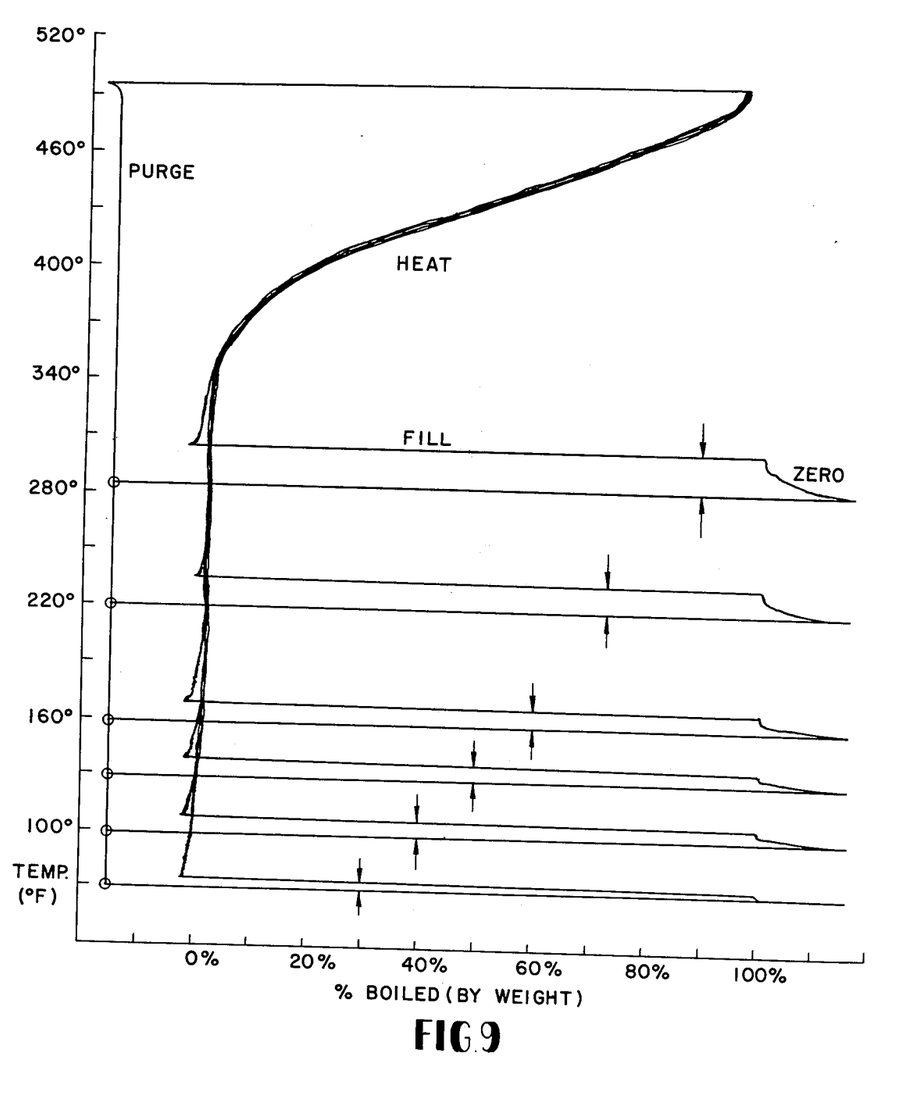
FIG. 9 illustrates the effect of varying the temperature of the sample holder on the cut-points of kerosene.

Referring now to FIG. 9 there is shown a comparison between the temperature at which the purging air was shut off and the filling of the sample tube commenced. It can be seen that regardless of the temperature at which the purging air was shut off and the sample tube filled one obtained substantially the same distillation curve. Thus, the final temperature of the sample tube after purging is not critical and can vary over a relatively wide range.

We claim as our invention:

1. A method for blending at least two liquid hydrocarbon components to form a blended liquid having temperature cut-points within preselected ranges, said method comprising:
   placing measured weight of each of said liquid components in a sample tube to form a sample of said blended liquid;
   heating the sample to vaporize it while removing the vapor from the sample;
   continuously measuring the temperature of the vapor of the sample;
   continuously weighing the sample;
   determining the measured temperature of the vapor after a predetermined weight the sample has been vaporized corresponding to one of the preselected cut-points; and
   utilizing the so determined measured temperature to control the amount of one liquid supplied to the blend to control said one pre-selected cut-point.

2. The method of claim 1 wherein the measured temperature corresponding to a second pre-selected cut-point is determined and used to control the amount of a second liquid added to said blend to control the density of said blend.

3. The method of claim 2 wherein said first pre-selected cut-point is less than 50% and said second pre-selected cut-point is more than 50% of the total sample.

4. The method of claim 2 and in addition measuring the density of said blend and using said density measurement to determine the weight of each liquid added to the sample tube.

* * * * *